UNITED STATES PATENT OFFICE.

PHILIPP EMANUEL, HEINRICH WÄCHTER, AND HANS ZUGT, OF HAMBURG, GERMANY.

BLACKING COMPOSITION.

SPECIFICATION forming part of Letters Patent No. 625,253, dated May 16, 1899.

Application filed November 14, 1898. Serial No. 696,449. (No specimens.)

*To all whom it may concern:*

Be it known that we, PHILIPP EMANUEL, HEINRICH WÄCHTER, and HANS ZUGT, subjects of the Emperor of Germany, and residents of Hamburg, Germany, have invented a certain new or Improved Blacking Composition, of which the following is a specification.

The object of this invention is to produce a blacking composition, more especially for dressing or "blacking" boots and shoes, which shall not need polishing by means of a brush or otherwise, but shall have a naturally polished or shiny surface, such blacking being, however, free from acids and other deleterious ingredients which have hitherto been employed in blacking of this nature and which have an injurious effect on leather.

The process of preparing our improved blacking is as follows: About three hundred and fifty grams of glue are dissolved in about four liters of water, and into this solution of glue the following substances are put in about the following quantities: fifty grams of Iceland moss, thirty grams of olive-oil, fifteen grams of castor-oil, fifteen grams of train-oil, sixty grams borax, and, according to the color required, thirty grams of nigrosine or some other coloring-matter. This mixture is boiled down to about half its bulk until it has the required appearance, and it is then poured into suitable vessels to cool.

The composition differs from previously-used varnish-like compounds in being soft and smooth and adapted to preserve the leather, owing to its contents of fatty matter, while it may be applied by a sponge, rag, or other means, and shows a sufficient polish without brushing.

We claim as our invention—

A composition for use as blacking for leather and intended to produce a polish without brushing, composed of a solution of glue in water, Iceland moss, borax, castor-oil, train-oil, olive-oil and a corresponding quantity of coloring-matter, this mixture being evaporated to the required consistence.

In testimony that we claim the foregoing as our invention we have signed our names, in presence of two witnesses, this 5th day of September, 1898.

PHILIPP EMANUEL.
   HEINRICH WÄCHTER.
   HANS ZUGT.

Witnesses:
 A. SCHAFER,
 G. HAUSCHILDT.